US009379579B2

(12) United States Patent
Kinnard

(10) Patent No.: US 9,379,579 B2
(45) Date of Patent: Jun. 28, 2016

(54) POWER SUPPLY WITH DUAL ASYMMETRICAL INPUTS

(71) Applicant: ORACLE INTERNATIONAL CORPORATION, Redwood City, CA (US)

(72) Inventor: J. Rothe Kinnard, Austin, TX (US)

(73) Assignee: ORACLE INTERNATIONAL CORPORATION, Redwood City ( * ) Notice: Subject to any disclaimer, the term of this patent is extended or adjusted under 35 U.S.C. 154(b) by 0 days.

(21) Appl. No.: 14/597,076

(22) Filed: Jan. 14, 2015

(65) Prior Publication Data
US 2015/0130279 A1 May 14, 2015

Related U.S. Application Data

(62) Division of application No. 13/189,242, filed on Jul. 22, 2011, now Pat. No. 8,963,371.

(51) Int. Cl.
H02J 1/10 (2006.01)
H02J 9/06 (2006.01)
G06F 1/26 (2006.01)

(52) U.S. Cl.
CPC .............. H02J 9/061 (2013.01); G06F 1/263 (2013.01); Y10T 307/615 (2015.04)

(58) Field of Classification Search
CPC .................... H02J 9/061; G06F 1/263
See application file for complete search history.

(56) References Cited

U.S. PATENT DOCUMENTS

| 6,630,753 | B2 * | 10/2003 | Malik | H02J 9/061 307/64 |
| 7,723,866 | B2 * | 5/2010 | Chang | G06F 1/263 307/64 |
| 2004/0003306 | A1 * | 1/2004 | Oomori | H02J 1/102 713/300 |
| 2005/0157525 | A1 * | 7/2005 | Hanson | H02M 1/10 363/65 |
| 2010/0066171 | A1 * | 3/2010 | Thakur | H02J 1/102 307/43 |

OTHER PUBLICATIONS

Jovanovic, Milan M., "Dual AC-Input Power System Architectures," IEEE Mar. 2002, 0-7803-7405.

* cited by examiner

Primary Examiner — Daniel Cavallari
(74) Attorney, Agent, or Firm — Marsh Fischmann & Breyfogle LLP; Daniel J. Sherwinter

(57) ABSTRACT

A dual asymmetric input power supply architecture for use in power systems employing input power source redundancy. The dual asymmetric input power supply operates from a main input of the power supply when acceptable voltage is present on the main input. If the main input fails or is out of tolerance, power can be supplied from an auxiliary input through a transformer isolated switching converter. The dual asymmetric input power supply architecture maintains the high efficiency of a single-input power supply while providing an auxiliary connection for input power source redundancy.

5 Claims, 8 Drawing Sheets

POWER SUPPLY WITH DUAL ASYMMETRICAL INPUTS

BACKGROUND

1. Field of the Description

This application relates generally to the field of power systems, and more particularly to high reliability power systems with redundant power supply units and/or the capability of operating from more than one independent electrical power source.

2. Relevant Background

Power systems for data processing and communications equipment are expected to provide power to electronic equipment with extremely high reliability. For example, data center power systems may be expected to provide greater than 99.9%, 99.99%, or even 99.999% availability of power for the electronic equipment of the data center. To provide this high reliability, these systems typically implement fault-tolerant architectures with redundant power paths through redundant power supply units and/or the capability of operating from more than one independent electrical power source.

Redundancy in power supply units may be provided by including additional power supply units. For example, power systems typically implement N+1 redundancy, meaning that if N power supply units are required to supply the required output load, the power system includes an additional power supply unit besides the required N power supply units. In this way, if any one of the power supply units is out of operation because of component failure or system maintenance, the power system can still supply the rated load.

Power supply unit redundancy can only improve the reliability of the system up to the reliability of the single input power source. Therefore, many power systems employ redundancy of input power sources. These systems may have multiple independent primary power sources or a primary power source and a backup power source such as a generator and/or battery back-up.

Some fault tolerant power systems use multiple independent alternating current (AC) input power sources. These systems are expected to operate properly from both AC input power sources or from either independent AC input source if the other source fails or is out of tolerance. In some systems, the output load should be shared between both independent AC input sources when both sources are present.

Power systems that accept multiple independent power sources must maintain isolation between each power source. One reason for power source isolation is that independent AC and/or direct current (DC) power sources may have differences in the reference point, voltage, frequency, and/or phase from one another. In addition, multiple input power sources must be isolated so that excessive current does not flow between the independent power sources. For example, a power supply accepting multiple independent AC inputs may be required to accept AC voltages from the input sources up to 240 volts and deliver tens of amps of current to a load without allowing more than a few thousandths of an amp of current to flow between the input sources.

High isolation between independent input sources is also a safety requirement. Non-isolated inputs may allow voltage to feed through from one input source to another input source, which may present an unacceptable safety hazard. For example, when an AC power cord is unplugged from a wall outlet, the prongs of the plug are exposed and easily touched. Therefore, voltage from other input power sources should not feed through to the exposed prongs of the unplugged AC power cord.

One power system architecture that provides multiple isolated input sources uses separate single-input power supply units rated for the full load providing power from each input source. This type of redundancy may be called N+N redundancy because, if N power supply units are required to supply the load from one input power source, N+N power supply units would be required to provide the load from two independent input power sources.

Another approach is to use dual-input power supply units with isolated input power paths. One type of dual-input power supply converts multiple AC input voltages from independent inputs to an isolated secondary DC voltage, which may then be combined. This type of dual-input power supply provides high isolation between inputs without degrading efficiency. However, this type of power supply does not have a significant advantage over the N+N redundant power system architecture with regard to cost or system volume.

A second type of dual-input power supply uses transformer isolation in each input power path within or just following a power factor correction stage of the power path. This approach avoids duplication of the low voltage output conversion circuits but reduces efficiency in each power path by about five percent by including two transformers in each input power path. Additionally, each power supply requires three transformers, all rated to the full output load of the power supply.

A third type of dual-input power supply uses relay switching between the input sources. Relay switching provides high isolation between input sources but has other disadvantages including difficulty in achieving a clean transfer under all possible fault conditions for AC input sources.

Accordingly, existing approaches to providing redundant input power sources to power systems involve a large increase in system cost or have drawbacks in switching between input power sources that may limit applicability in high-reliability power systems.

SUMMARY

Embodiments of the present invention are directed to a dual asymmetric input power supply architecture for use in power systems employing input power source redundancy. The dual asymmetric input power supply architecture maintains the high efficiency of a single-input power supply while providing an auxiliary connection that may be connected to an auxiliary or secondary input power source. The auxiliary connection uses the power factor correction and energy storage of the main power path from the main power input to avoid duplication of circuits in the power supply. The dual asymmetric input design meets operational and safety isolation requirements between the main and auxiliary inputs. The dual asymmetric input power supply can be designed to start and operate with either or both inputs connected to input power sources. In the dual asymmetric input power supply architecture, the efficiency of the main power path is not degraded by the auxiliary input path, and there is not possibility of accidentally inhibiting the main input path since it is always active. Switching from the main input to the auxiliary input can be done very quickly since there are no large energy storage components or mechanical switching devices in the auxiliary path. The dual asymmetric input power supply has the same output power capability and input fault ride-through capability when operating from either input. In various embodiments, the auxiliary input can be an optional feature for a single-input power supply.

According to one aspect consistent with various embodiments, a power converter includes a primary power input, an auxiliary power input, and a converter output. A rectifier is coupled to the primary input of the power converter that provides a rectified voltage at a rectifier output. A converter circuit is coupled to the rectifier output that receives the rectified voltage and provides output power at the converter output. An isolated switching converter circuit is coupled to the auxiliary input that provides an auxiliary rectified voltage at the rectifier output upon detection of a failure condition of the primary input power supply voltage.

According to other aspects consistent with various embodiments, the power converter includes a primary input failure detection circuit coupled to the primary power input and to the isolated switching converter circuit through a galvanically isolated coupling. The galvanically isolated coupling may be an optical coupling. The auxiliary controller may activate a switching element of the isolated switching converter upon detection of the failure condition. The isolated switching converter circuit may include a transformer having a primary winding coupled to the auxiliary power input, a switching element coupled to the primary winding of the transformer, and an auxiliary controller circuit coupled to the switching element. The converter stage may include a power factor correction circuit and a switching-mode converter stage that includes a switching element and a transformer element.

According to other aspects consistent with various embodiments, a power system may include a plurality of power converters, with each power converter including an isolated switching converter circuit coupled to an auxiliary input of the power converter that provides a rectified voltage to an input of a power factor correction circuit in the main power path upon detection of a failure condition on the primary power input. A primary input of a first power converter may be coupled to a first power source of the power system, and an auxiliary input of the first power converter may be coupled to a second power source of the power system. A primary input of a second power converter may be coupled to the second power source, and an auxiliary input of the second power converter may be coupled to the first power source. The first power source and the second power source may be independent AC power sources.

According to other aspects consistent with various embodiments, a power system may include a power converter having an isolated switching converter circuit coupled to an auxiliary input of the power converter that provides a rectified voltage to an input of a power factor correction circuit in the main power path upon detection of a failure condition on the primary power input. A primary input of the power converter may be coupled to a primary AC power source of the power system, and an auxiliary input of the power converter may be coupled to a an auxiliary DC power source of the power system.

According to other aspects consistent with various embodiments, a power converter includes a primary power input, an auxiliary power input, and a converter output. A converter stage is coupled to the rectifier output that receives the rectified voltage and provides a DC output voltage at the converter output. An auxiliary input circuit is coupled to the auxiliary power input and includes a transformer isolated switching converter that provides a transformer isolated voltage from the auxiliary power input at the converter input upon detection of a failure condition of the primary power input. The converter stage may include an active power factor correction circuit that provides a DC voltage to a power conversion circuit while drawing an input current that is sinusoidal and in phase with an AC voltage on the primary power input. The transformer isolated switching converter may include a switching element that is activated by an auxiliary control circuit upon detection of the failure condition of the primary power input. Activating the switching element may include opening and closing the switching element at a predetermined frequency. The transformer isolated switching converter may include a plurality of switching elements. The plurality of switching elements may be activated with out-of-phase switching signals upon detection of the failure condition of the primary power input. According to other aspects consistent with various embodiments, a power converter includes a primary power input and a converter stage coupled to the primary power input that converts an unregulated input voltage at a converter input to a regulated output voltage at a power converter output. An auxiliary power input to the power converter is enabled by monitoring the primary power input, detecting a failure condition of the primary power input, and activating an auxiliary switching mode input circuit, in response to detecting the fail condition, to provide a rectified voltage at the converter input from the auxiliary power input. Detecting of the failure condition may include comparing a voltage of the primary power input with a threshold, detecting a voltage instability at the primary power input, and/or detecting a frequency instability at the primary power input. The auxiliary power input may be monitored such that it can be determined whether an auxiliary input power source is connected to the auxiliary power input before the activating of the auxiliary switching mode input circuit.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

High reliability power supply systems typically have fault tolerant architectures that include redundant power supply components. For example, a high-reliability power system may include fault tolerance of the power supply units ("PSUs") used in the power system such that the system can maintain its full performance capability when any one of the PSUs is out of operation because of component failure or system maintenance. In addition, high reliability power systems may include the capability of operating from more than one independent electrical power source. For example, a power system may have multiple independent AC input power sources or a primary AC power source and an AC or DC backup power source. The power system should be able to operate from one or both input power sources during normal operation. If one of the input power sources fails, the power system should be able to operate from the remaining input power source without disrupting power delivery. It may be desirable in power systems operating from multiple independent power sources that the output load be shared between the input sources when both are present.

Embodiments of the present invention are directed to a dual asymmetric input power supply architecture for use in power systems employing input power source redundancy. The dual asymmetric input power supply architecture maintains the high efficiency of a single-input power supply while providing an auxiliary connection for input power source redundancy. Aspects of the dual asymmetric input power supply architecture provide input power source redundancy at a lower cost and system volume than power systems employing single-input or dual-input power supplies.

Figure 1:
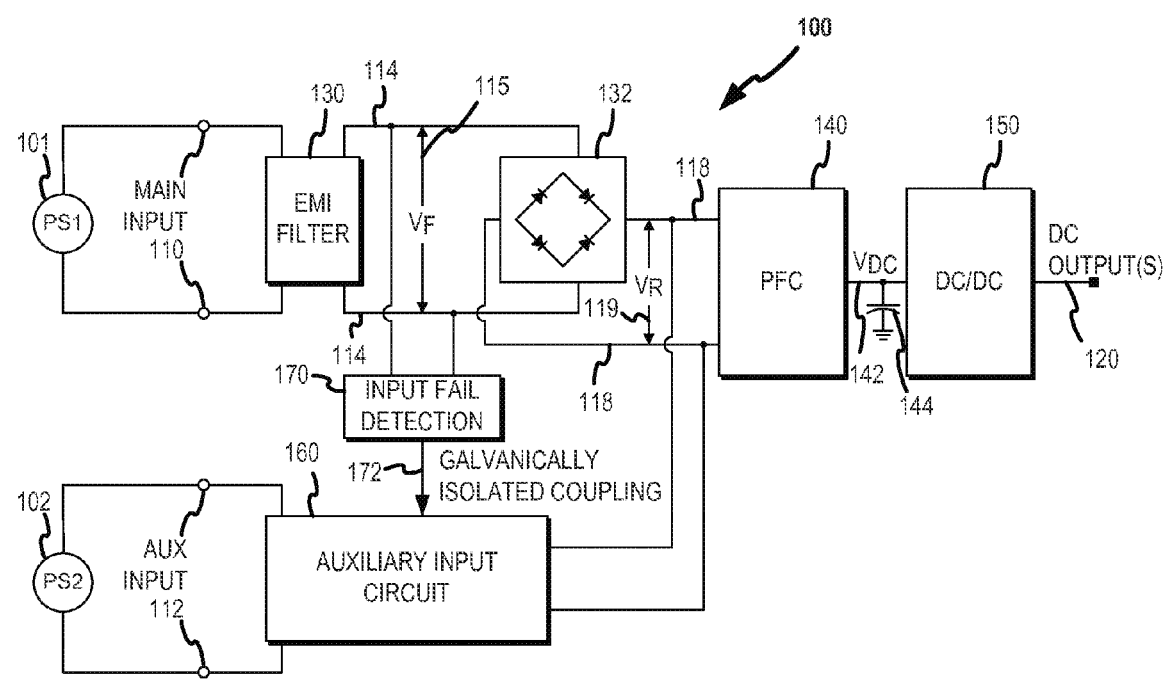
FIG. 1 is a block diagram of a dual asymmetric input power supply unit, according to various embodiments.

FIG. 1 illustrates a block diagram of a dual asymmetric input PSU 100 according to various embodiments. Dual asymmetric input PSU 100 has a main or primary power input 110 and an auxiliary power input 112. Generally, main input 110 is connected to a primary power source (not shown) for dual asymmetric input PSU 100 and auxiliary input 112 is connected to an auxiliary power source (not shown). When the primary power source is present at main input 110, dual asymmetric input PSU 100 supplies the load power at DC output(s) 120 from the primary power source through main input 110. In this instance, auxiliary input circuit 160 is disabled and dual asymmetric input PSU 100 does not draw power from auxiliary input 112. If the input power source connected to main input 110 fails or is out of tolerance, dual asymmetric input PSU 100 can switch to operating from the auxiliary input power source connected to auxiliary input 112. Switching from the main input 110 to the auxiliary input 112 in dual asymmetric input PSU 100 can be done very quickly because there are no large energy storage components or mechanical switching devices in the auxiliary power path.

Commonly, the primary input power source will be an AC power source. The AC power source connected to main input 110 is filtered with EMI filter 130 to provide a filtered AC voltage ($V_F$) 115 at the EMI filter output 114. The filtered AC voltage 115 is rectified by bridge rectifier 132 to provide rectified voltage ($V_R$) 119 at rectifier output 118. The rectified voltage ($V_R$) 119 is input to power factor correction ("PFC") module 140 which typically generates a regulated DC voltage ($V_{DC}$) at the PFC output 142. For example, PFC module 140 may generate a DC voltage in the range of 375-400 VDC with regulation on the order of +/− 10%. Capacitor(s) 144 filters the DC voltage ($V_{DC}$) at PFC circuit output 142 such that it does not vary substantially over the AC cycle period of the AC power source connected to main input 110. DC/DC converter 150 receives the DC voltage ($V_{DC}$) from PFC output 142 and generates one or more regulated DC output voltage(s) and/or current(s) at power supply DC output(s) 120.

If the primary power source connected to main input 110 fails, dual asymmetric input PSU 100 can switch to an auxiliary power source connected to auxiliary input 112 without interrupting the output power at DC output(s) 120. Specifically, auxiliary input circuit 160 is enabled and supplies power from auxiliary input 112 to the input 118 of PFC circuit 140 when a failure condition is detected for the main input 110. In this instance, PFC circuit 140 and DC/DC converter 150 operate normally using power supplied from auxiliary input 112 through auxiliary input circuit 160. Auxiliary input circuit 160 can be rapidly enabled such that the power delivery to the input of PFC circuit 140 is not substantially interrupted. In this way, the power output of dual asymmetric input PSU 100 through PFC circuit 140 and DC/DC converter 150 is not interrupted when the input source connected to main AC input 110 fails. In various embodiments, auxiliary input circuit 160 may accept an AC voltage, high-voltage DC, or low-voltage DC power input at auxiliary input 112.

In some exemplary embodiments, dual asymmetric input PSU 100 includes input fail detection circuit 170 that indicates a failure condition of main input 110 to auxiliary input circuit 160 through galvanically isolated coupling 172. Galvanically isolated coupling 172 allows input fail detection circuit 170 to provide a signal indicating whether the input power source connected to main input 110 is within or outside of tolerance to auxiliary input circuit 160 while maintaining isolation between main input 110 and auxiliary input 112. For example, galvanically isolated coupling 172 allows input fail detection circuit to provide a signal indicating whether main input 110 is present regardless of voltage reference, voltage amplitude, frequency, and/or phase differences between main input 110 and auxiliary input 112. Galvanically isolated coupling 172 may be, for example, an optical coupling.

Figure 2:
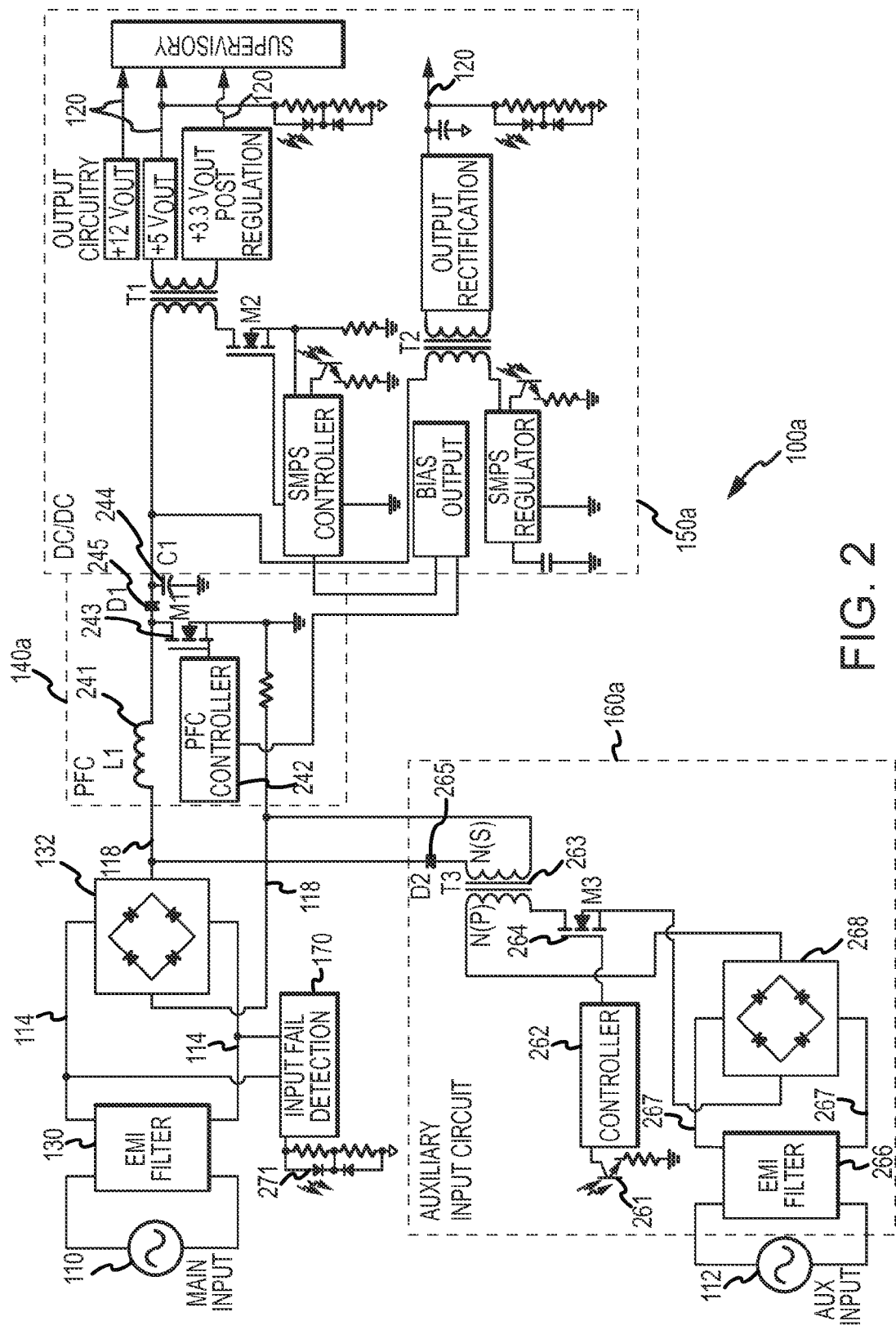
FIG. 2 is a circuit diagram of a dual asymmetric input power supply unit, according to various embodiments.

FIG. 2 illustrates a circuit diagram of one embodiment of a dual asymmetric input PSU 100a in more detail. As illustrated in FIG. 2, main input 110 of dual asymmetric input PSU 100a is connected to PFC circuit 140a through EMI filter 130 and bridge rectifier 132. Generally, main input 110 will be connected to an AC input power source. PFC circuit 140a may be any suitable active or passive PFC circuit that makes the AC input current waveform of dual asymmetric input PSU 100a sinusoidal and in phase with the AC input voltage of an AC input power source. As shown in FIG. 2, PFC circuit 140a is a boost (or step-up) converter that includes inductor 241, PFC controller 242, switching element 243, diode 245, and bypass or bulk capacitor 244. However, other suitable active or passive PFC topologies may also be used. For example, PFC circuit 140a may be another non-transformer isolated switching power supply topology such as a buck or buck/boost converter topology.

DC/DC converter 150a of dual asymmetric input PSU 100a may be any suitable DC/DC converter(s) that supplies power at regulated output voltage(s) and/or current(s) from the DC output of PFC circuit 140a. As illustrated in FIG. 2, DC/DC converter 150a of dual asymmetric input PSU 100a includes switching-mode power conversion circuits that supply power at multiple output voltages. However, DC/DC converter 150a may be any DC/DC converter topology that supplies and regulates voltage(s) and/or current(s) at DC power output(s) 120 of dual asymmetric input PSU 100a. In various embodiments, PFC circuit 140a and DC/DC converter 150a may be combined into one or more switching mode power converters. For example, PFC circuit 140a and DC/DC converter 150a may be replaced by a single-stage converter circuit that provides regulated output voltage(s) and/or current(s) at DC power output(s) 120.

As illustrated in FIG. 2, auxiliary input circuit 160a includes a transformer isolated switching converter that drives the input of PFC circuit 140a from auxiliary input 112 when a fail condition is detected on main input 110. The transformer isolated switching converter of auxiliary input circuit 160a includes controller 262, transformer 263, switching transistor 264, and output diode 265. Auxiliary input circuit 160a may supply power from an auxiliary AC or high-voltage DC power source. The ratio of number of turns in the secondary winding (N(S)) compared to the number of turns in the primary winding (N(P)) (i.e., turns ratio) for transformer 263 may be adjusted to provide a suitable voltage for input to PFC circuit 140a from the auxiliary input 112. For example, a turns ratio of 1:1 for transformer 263 provides approximately equal input and output voltages of auxiliary input circuit 160a. In this instance, auxiliary input circuit 160a could accept either an AC input voltage in the 100 VAC to 240 VAC range or a DC input in the 140 VDC to 340 VDC range. A different turns ratio for transformer 263 could be used to provide a different auxiliary AC or DC input voltage range.

The transformer isolated switching converter of auxiliary input circuit 160a provides isolation between auxiliary input 112 and main input 110 of dual asymmetric input PSU 100a. Specifically, main input 110 and auxiliary input 112 are isolated from each other by transformer 263 of auxiliary input circuit 160a. When auxiliary input 112 is unplugged, power does not feed back from main input 110 through transformer 263 to auxiliary input 112. When dual asymmetric input PSU 100a is operating from auxiliary input 112, circuits connected to main input 110 become secondary circuits isolated from the auxiliary input power source connected to auxiliary input 112. While these circuits are isolated from the auxiliary input source, hazardous voltage should also be prevented from feeding back from auxiliary input 112 to main input 110. Bridge rectifier 130 prevents the rectified voltage 118 from appearing at main input 110. Main input 110 and auxiliary input 112 will meet the UL/EN 60950 safety standard requirements for operator accessible limited current circuits including the test with a single failure of any component.

As illustrated in FIG. 2, the transformer isolated switching converter of auxiliary input circuit 160a is a forward-mode converter. However, other transformer isolated switching converter topologies may be used in auxiliary input circuit 160a. For example, flyback, push-pull, half-bridge, or full-bridge converter topologies may be used in various embodiments.

Still referring to FIG. 2, the operation of dual asymmetric input PSU 100a is described in more detail. The main power path supplying power from main input 110 to PFC circuit 140a and DC/DC converter 150a is always active. Therefore, there is no possibility that the main power path will be disabled. Typically, when the primary input power source connected to main input 110 is present, auxiliary input circuit 160a is disabled. For example, controller 262 disables auxiliary input circuit 160a by driving transistor 264 to an off or open state. When transistor 264 is maintained in an off state, no current flows through transformer 263 and auxiliary input circuit 160a will not supply a voltage to the input 118 of PFC circuit 140a. With auxiliary input circuit 160a disabled, the efficiency of dual asymmetric input PSU 100a is not degraded by the presence of auxiliary input circuit 160a.

Input fail detection circuit 170 monitors the voltage on main input 110, e.g., by monitoring the voltage 114 at the output of the EMI filter 130. If input fail detection circuit 170 detects a fail condition, it notifies auxiliary input circuit 160a by way of optical coupling 271, which is received by auxiliary input circuit 160a at optical coupling sensor 261. Input fail detection circuit 170 includes circuits for monitoring main input 110 and detecting failure conditions. Failure conditions of main input 110 detected by input fail detection circuit 170 may include an out of tolerance voltage range, frequency fluctuations, and/or other failure conditions.

Controller 262 receives the notification indicating a failure on main input 110 and can enable auxiliary input circuit 160a by driving transistor 264 with an appropriate switching signal to supply power to the input 118 of PFC circuit 140. The switching signal to transistor 264 is generally a higher frequency than the typical line frequency of 50-60 Hz. For example, controller 262 may drive transistor 264 with a signal that switches at a frequency in the range of 10-100 KHz.

Dual asymmetric input PSU 100a operates in a similar manner to a dual-input power supply with input relay switching, but the input source switching is much faster and the dual-asymmetric input PSU is able to operate simultaneously from both inputs without problems. Main input 110 is used when both inputs are present because it has the higher efficiency power path. When a problem is detected on main input 110, auxiliary input circuit 160a can be enabled to provide power from auxiliary input 112 fast enough to maintain the power output at DC output(s) 120. For example, auxiliary input circuit 160a may be enabled in less than one millisecond. Bulk capacitor 244 typically maintains enough charge that no disruption of power at DC output(s) 120 occurs when the primary input source fails and auxiliary input circuit 160a is enabled. False alarms are not a problem because auxiliary input circuit 160a can be turned on and off at any time even while the main input 110 is present. The only effects of cycling the auxiliary input are temporary loss of efficiency and a possible reduction in power factor when operating from two independent AC input sources. When the output power of dual asymmetric input PSU 100a is supplied from auxiliary input 112, the efficiency of the power supply is lower by about 5% because of the additional transformer in the power path of auxiliary input circuit 160a.

In embodiments, dual asymmetric input PSU 100a monitors auxiliary input 112 and uses information about both main input 110 and auxiliary input 112 to determine when to enable the power path from auxiliary input 112. In one embodiment, dual asymmetric input PSU 100a only enables the power path through auxiliary input circuit 160a when a sufficient voltage is present on auxiliary input 112 to supply the required power output for dual asymmetric input PSU 100a. In another embodiment, dual asymmetric input PSU 100a evaluates whether main input 110 or auxiliary input 112 should be used based on voltage, frequency, and/or phase of main input 110 and auxiliary input 112. Dual asymmetric input PSU 100a then enables auxiliary input circuit 160a if auxiliary input 112 is the preferred input power source. In these embodiments, input fail detection circuit 170 may monitor both main input 110 and auxiliary input 112, providing an enable signal to controller 262 when the auxiliary power path from auxiliary input 112 should supply power instead of the main power path from main input 110.

In some exemplary embodiments, dual asymmetric input PSU 100a may analyze the voltage, frequency, and/or phase of main input 110 to predict an imminent failure of main input 110 and determine an appropriate time to enable auxiliary input circuit 160a. For example, dual asymmetric input PSU 100a may compare the voltage on main input 110 with a threshold to determine if the main power supply is present. Alternatively, dual asymmetric input PSU 100a may detect a voltage and/or frequency instability on main input 110 to determine if failure of main input 110 is imminent. In embodiments, dual asymmetric input PSU 100a predicts an imminent failure of the primary input power source connected to main input 110 and enables auxiliary input circuit 160a to supply power to PFC circuit 140a from auxiliary input 112 before the primary input power source fails.

In FIG. 2, switching elements including transistors 243 and 264 are illustrated as metal oxide semiconductor field effect transistors ("MOSFETs"). However, any suitable switching element may be used for the switching elements of dual asymmetric input PSU 100a. For example, other suitable switching elements include bipolar junction transistors ("BJTs"), junction gate field-effect transistors ("JFETs"), insulated gate bipolar transistor ("IGBTs"), and/or other common switching elements. Circuit design and implementation of PFC controller 242, input fail detection circuit 170, controller 262, and the circuit blocks that make up DC/DC converter 150a are within the knowledge of those of skill in the art, and need not be described further herein. These circuits may be a combination of integrated and discrete circuit components such as application specific integrated circuits ("ASICs"), transistors, capacitors, resistors, inductors, or the like.

Figure 3:
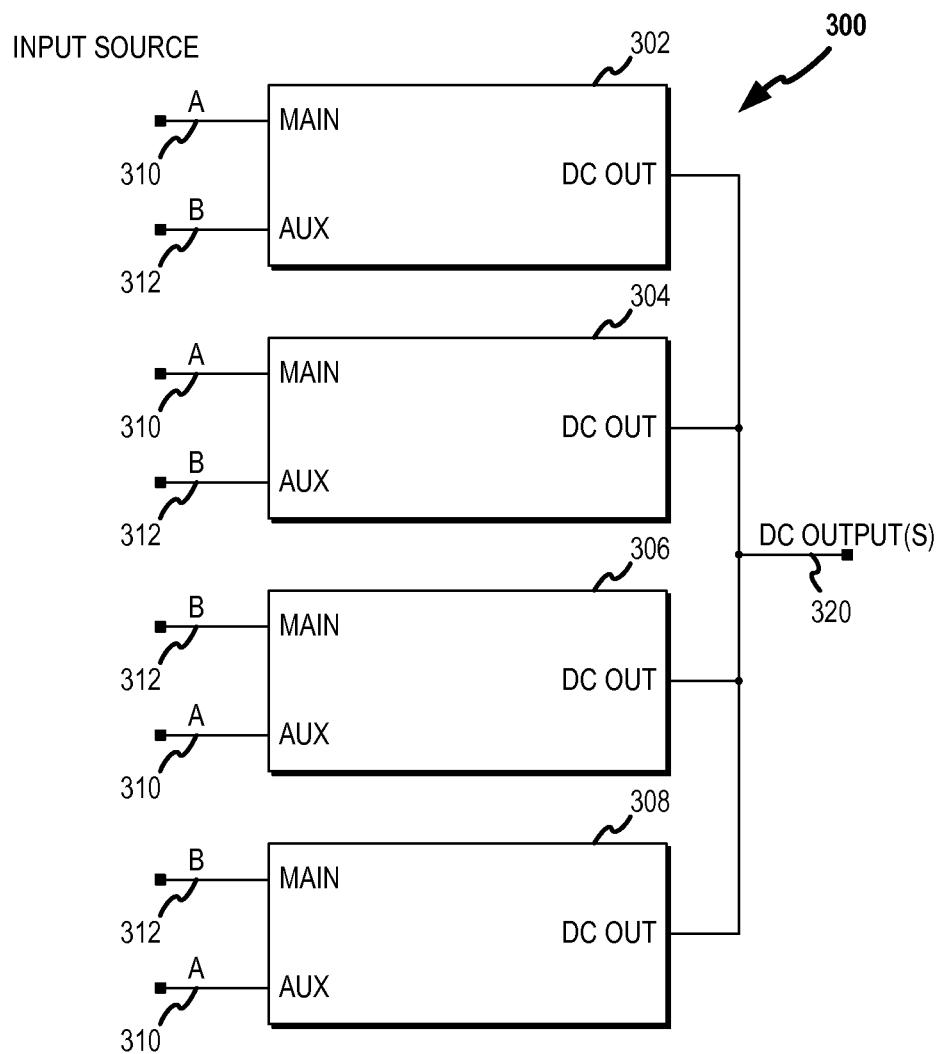
FIG. 3 illustrates a power system that employs dual asymmetric input power supply units, according to various embodiments.

FIG. 3 illustrates power system 300 that employs dual asymmetric input PSUs to provide PSU redundancy and/or input power source redundancy according to various embodiments described herein. In power system 300, dual asymmetric input PSUs 302 and 304 have main inputs connected to input power source A 310 and auxiliary inputs connected to input power source B 312. Dual asymmetric input PSUs 306 and 308 have main inputs connected to input power source B 312 and auxiliary inputs connected to input power source A 310. Therefore, if both input power source A 310 and input power source B 312 are present, power supplies 302 and 304 supply approximately half of the load power at DC output(s) 320 through their main power paths from input power source A and power supplies 306 and 308 supply the remainder of the load power through their main power paths from input source B 312. While power system 300 is typical of a power system with two independent AC input sources, input power source A 310 and input power source B 312 may be AC or DC input power sources.

In one embodiment, power system 300 employs an N+1 redundant configuration providing PSU redundancy and input power source redundancy. For example, if each dual asymmetric input PSU 302, 304, 306, and 308 can supply 3000 watts, power system 300 can support a load of 9000 watts with both PSU redundancy and input power source redundancy. If one dual asymmetric input PSU of power system 300 fails, the remaining PSUs can still supply the rated power through the remaining power supplies. In this instance, the fault condition is tolerated without interruption of output power at DC output(s) 320.

Similarly, if one of input power source A 310 or input power source B 312 fails, power system 300 can still supply the rated power from the remaining input power source. For example, if input power source A 310 fails, dual asymmetric input PSUs 302 and 304 switch over to their auxiliary inputs and supply power to DC output(s) 320 from input power source B 312. In this instance, output power is supplied by power system 300 at DC output(s) 320 from dual asymmetric input PSUs 306 and 308 through their main power paths and from dual asymmetric input PSUs 302 and 304 through their auxiliary power paths. Dual asymmetric input PSUs 302 and 304 have slightly reduced efficiency because they are operating through their auxiliary power paths to supply power from input power source B 312.

While FIG. 3 illustrates power system 300 including four dual asymmetric input PSUs in a 3+1 redundant configuration with PSU redundancy and input power source redundancy, dual asymmetric input PSUs may be used in various other configurations to provide PSU redundancy and/or input power source redundancy in a power system. For example, dual asymmetric input PSUs may be used in an N+1 configuration to provide PSU redundancy and/or input power source redundancy for any value of N, including N=1, N=2, N=3, N=4, and so on.

In another embodiment, a power system with an AC primary power source and a DC backup power source may use dual asymmetric input PSUs to provide PSU and/or input power source redundancy. In this instance, the AC primary power source is connected to the main inputs of each dual asymmetric input PSU while the DC backup power source is connected to the auxiliary inputs of each dual asymmetric input PSU. When the AC primary power source is present, the dual asymmetric input PSUs operate from the AC primary power source. The DC backup power source may be present and ready to provide power if the AC primary power source fails. However, the dual asymmetric PSUs will not draw power from the DC backup power source until the AC primary source fails. If the AC primary power source does fail, the dual asymmetric input PSUs will switch over to the DC backup power source and continue to supply the rated power at the DC output load from the DC backup power source.

Figure 4:
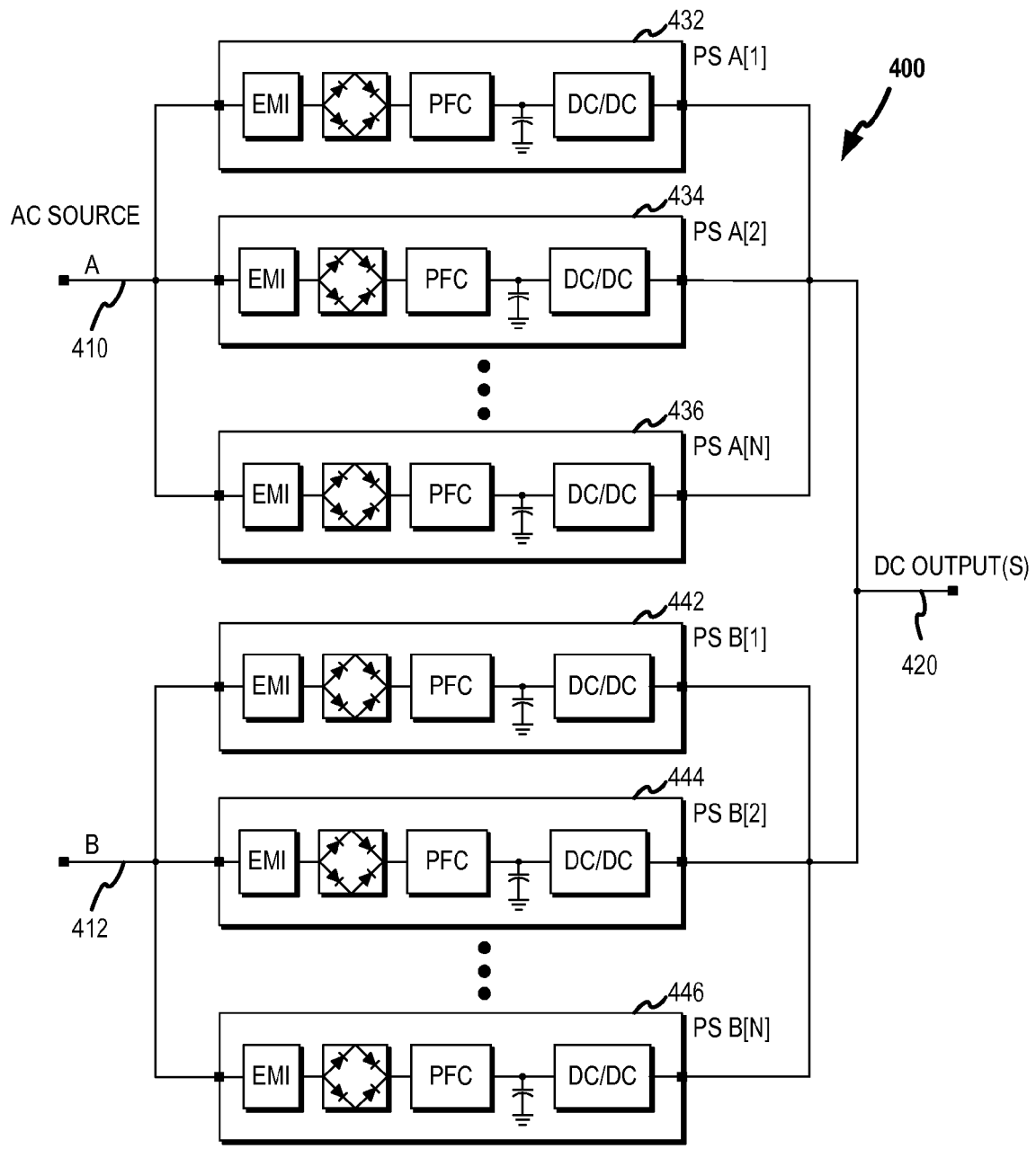
FIG. 4 illustrates a power system that employs single-input power supply units, according to various embodiments.

In various configurations, power systems employing dual asymmetric input PSUs have significant advantages over previous known methods of providing power supply and/or input power source redundancy in terms of system cost and volume. One previous method of providing input power source redundancy is an N+N single-input PSU configuration. FIG. 4 illustrates a power system 400 employing single-input PSUs configured in an N+N redundant system. In power system 400, single-input PSUs 432, 434, and 436 are connected to input power source A 410 while single-input PSUs 442, 444, and 446 are connected to input power source B 412. In power system 400, each component of the single-input PSUs is duplicated in the N+N single-input PSU redundant architecture. Notably, the N+N single-input PSU redundant architecture of power system 400 provides only input redundancy or PSU redundancy and not both types of redundancy. This means that the N+N single-input PSU architecture is not tolerant of an input failure and a PSU failure at the same time.

A comparison of the N+N single-input PSU redundant architecture for providing input source redundancy to the N+1 dual asymmetric input PSU redundant architecture illustrates the advantages in cost and power system volume of systems employing dual asymmetric input PSUs. The following table estimates the reduction in power system product volume using an N+1 dual asymmetric input PSU architecture when compared to an N+N single-input PSU architecture for a total power supply load of 5000 watts. The table assumes that a single-input PSU achieves a power density of 25 W/in³ and that a dual asymmetric input PSU has a 30% increase in PSU volume (estimates range from 25% to 30% for current PSU circuit topologies). As can be seen, the power supply volume reduction using dual asymmetric input PSUs becomes larger and larger as N increases.

| | N + N single-input PSU Configuration | | | N + 1 dual asymmetric input PSU Configuration | | | |
|---|---|---|---|---|---|---|---|
| N | Total PSUs | PSU Rating (Watts) | Total System Volume (in³) | Total PSUs | PSU Rating (Watts) | Total System Volume (in³) | Volume Change (%) |
| 1 | 2 | 5000 | 400 | 2 | 5000 | 520.0 | 30 |
| 2 | 4 | 2500 | 400 | 3 | 2500 | 390.0 | −2.5 |
| 3 | 6 | 1666.7 | 400 | 4 | 1666.7 | 346.7 | −13.3 |
| 4 | 8 | 1250 | 400 | 5 | 1250 | 325.0 | −18.8 |

| | N + N single-input PSU Configuration | | | N + 1 dual asymmetric input PSU Configuration | | | |
|---|---|---|---|---|---|---|---|
| N | Total PSUs | PSU Rating (Watts) | Total System Volume (in³) | Total PSUs | PSU Rating (Watts) | Total System Volume (in³) | Volume Change (%) |
| 5 | 10 | 1000 | 400 | 6 | 1000 | 312.0 | −22.0 |
| 6 | 12 | 833.3 | 400 | 7 | 833.3 | 303.3 | −24.2 |
| 7 | 14 | 714.3 | 400 | 8 | 714.3 | 297.1 | −25.7 |

Figure 5:
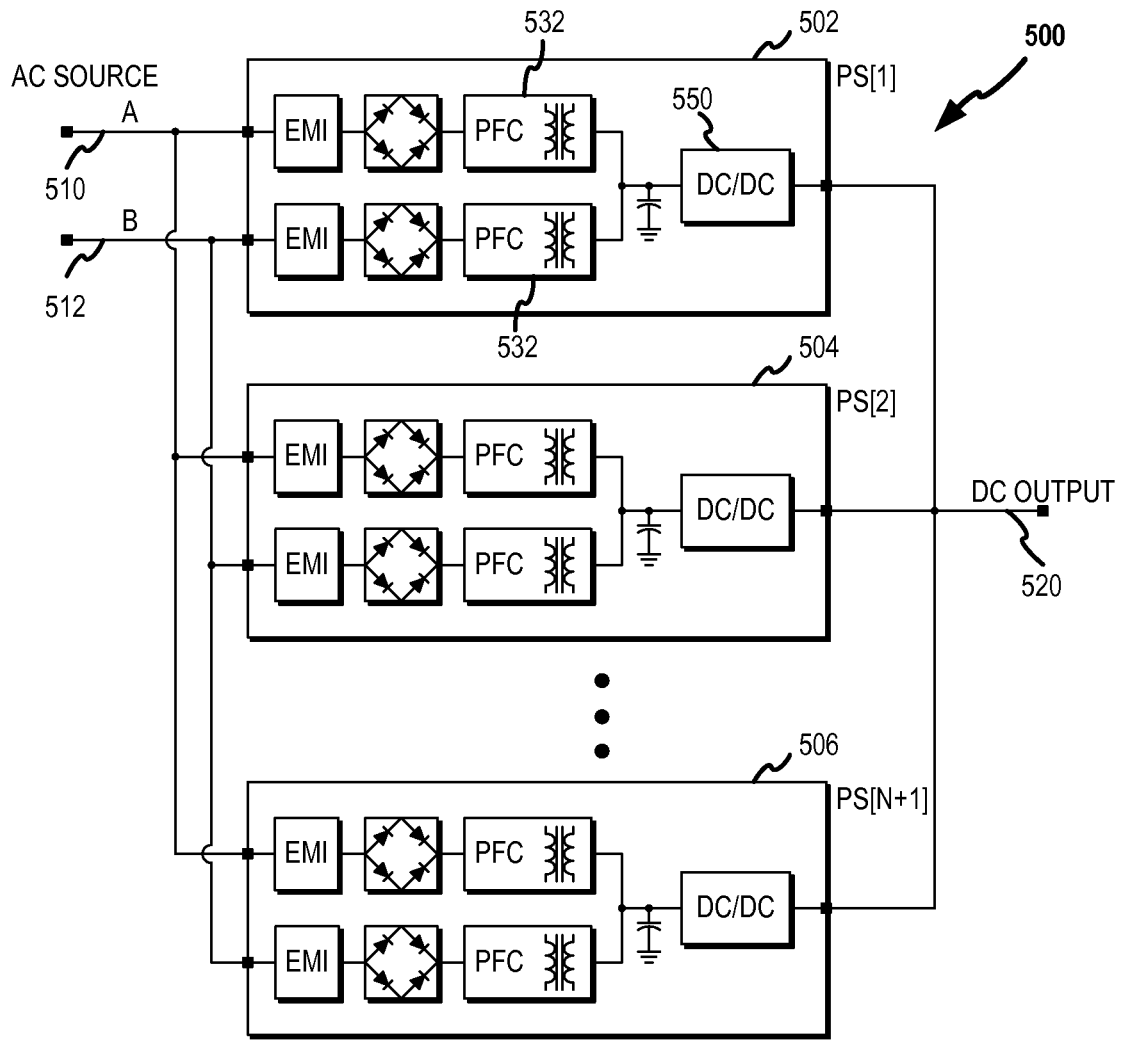
FIG. 5 illustrates a power system that employs dual-input power supply units, according to various embodiments.

Another previous method of providing input power source redundancy in power systems is to use dual-input PSUs with transformer isolation of the inputs within or directly after the PFC stage. FIG. 5 illustrates a power system 500 that employs dual-input PSUs and provides input power source and PSU redundancy with an N+1 redundant architecture. In power system 500, each PSU 502, 504, 506 has two transformer-isolated PFC circuits 532 feeding one DC/DC converter stage 150. This approach avoids duplication of the DC/DC conversion stage but reduces efficiency of the power supply operating from either and/or both power supply inputs by about 5% because of the additional transformer in each power supply path. Additionally, each dual-input PSU has three transformers, each rated for the full output power of the PSU. As a result, the dual-input PSU does not offer significant cost or system volume advantages over the single-input PSU N+N redundant architecture and reduces power system efficiency under normal operating conditions.

As discussed above, power systems may use a variety of back-up power sources. These sources include independent AC input sources, generators, and/or battery-back up uninterruptible power supplies ("UPSs"). Auxiliary input circuit 160 of dual asymmetric input PSU 100 may be designed to accept an AC voltage, high-voltage DC, and/or low-voltage DC auxiliary power source to support a variety of independent or back-up power sources.

Figure 6:
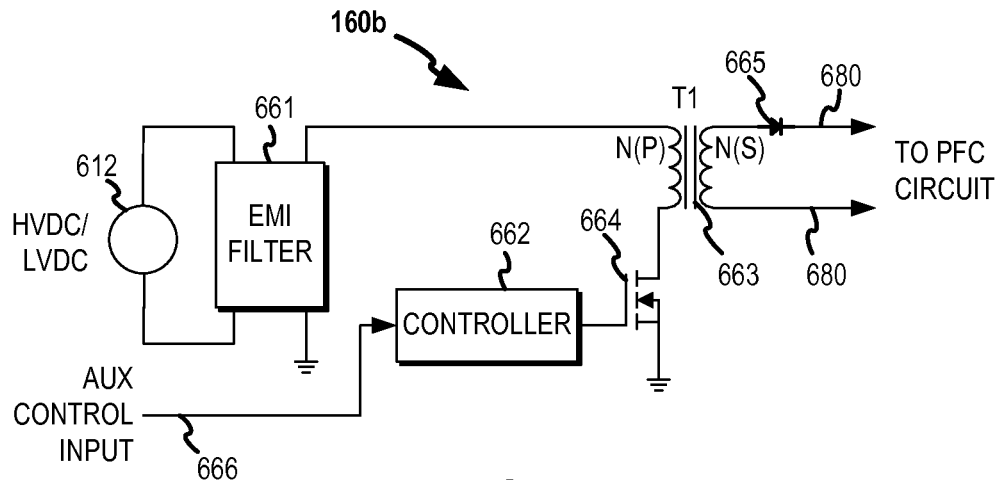
FIG. 6 illustrates an auxiliary input circuit that may be employed in a dual asymmetric input power supply unit, according to various embodiments.

FIG. 6 illustrates an alternative auxiliary input circuit 160b that may be employed in dual asymmetric input PSU 100 for supplying power from a high-voltage DC or low-voltage DC input power source according to various exemplary embodiments. Auxiliary input circuit 160b includes transformer 663, transistor 664, auxiliary input controller 662, and output diode 665. Auxiliary input controller 662 receives auxiliary control input 666 that indicates whether the input source of main AC input 110 is present. For example, auxiliary control input may come from an input fail detection circuit, such as input fail detection circuit 170 of dual asymmetric input PSU 100 through galvanically isolated coupling 172. When the primary power source connected to main input 110 of dual asymmetric input PSU 100 is present, auxiliary input circuit 160b is disabled, which means that controller 662 drives the transistor 664 to an off state. In this instance, auxiliary input circuit 160b does not provide power at output 680 to the input 118 of PFC circuit 140 of dual asymmetric input PSU 100. If auxiliary control input 666 of auxiliary input circuit 160b indicates that the main input 110 of dual asymmetric input PSU 100 has failed or is out of tolerance, auxiliary input controller 662 enables auxiliary input circuit 160b by switching transistor 664 at an appropriate switching frequency. For example, auxiliary input controller may switch transistor 664 at a switching frequency in the range of 10-100 KHz. In one embodiment, transistor 664 is switched at approximately 50 KHz. In this instance, auxiliary input circuit supplies power at output 680 to the input 118 of PFC circuit 140 from the DC power source connected to auxiliary input 612. Auxiliary input circuit 160b may include EMI filter 630 to filter auxiliary input 612.

In auxiliary input circuit 160b, the turns ratio (N(P):N(S)) of transformer 663 may be changed to provide for a different range of DC input voltages. A lower turns ratio may be used for higher voltage DC input sources. For example, a turns ratio of 1:1 may be acceptable for high-voltage DC input sources in the range of 140 VDC to 340 VDC. For a lower DC input voltage range, a higher turns ratio may be used. For example, for auxiliary input circuit 160b to accept a 48 VDC nominal input voltage on auxiliary input 612, a turns ratio of 1:4 may be used. Typically, auxiliary input circuit 160b can accept a wide range of DC voltage variation on auxiliary input 612 and still supply the rated power of dual asymmetric input PSU 100 from auxiliary input 612. For example, the range of maximum accepted voltage to minimum accepted voltage may be approximately a factor of 3 to 1.

Figure 7:
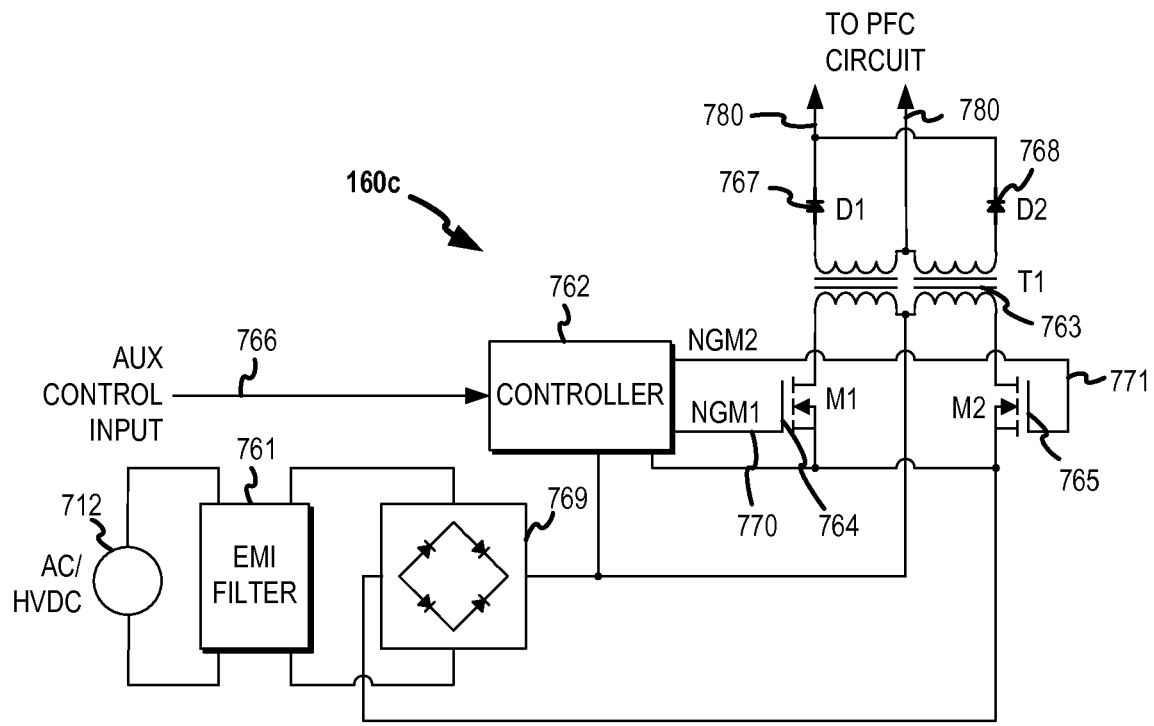
FIG. 7 illustrates an auxiliary input circuit that may be employed in a dual asymmetric input power supply unit, according to various embodiments.

FIG. 7 illustrates an alternative auxiliary input circuit 160c that may be employed in dual asymmetric input PSU 100 for supplying power from AC or DC voltage sources. Auxiliary input circuit 160c includes transformer 763, transistors 764 and 765, auxiliary input controller 762, and output diodes 767 and 768. Auxiliary input controller 762 receives auxiliary control input 766 that indicates whether the primary input source connected to main input 110 is present. For example, auxiliary control input 766 may come from input fail detection circuit 170 of dual asymmetric input PSU 100 through galvanically isolated coupling 172. When the primary input source connected to main input 110 of dual asymmetric input PSU 100 is present, auxiliary input circuit 160c is disabled, meaning that auxiliary input circuit 160c does not provide power to the input 118 of PFC circuit 140. If auxiliary control input 766 of auxiliary input circuit 160c indicates that the primary input source connected to main input 110 of dual asymmetric input PSU 100 has failed or is out of tolerance, auxiliary input controller 762 enables auxiliary input circuit 160c such that it supplies power to the input 118 of PFC circuit 140 from the input power source connected to auxiliary input 712.

Figure 8:
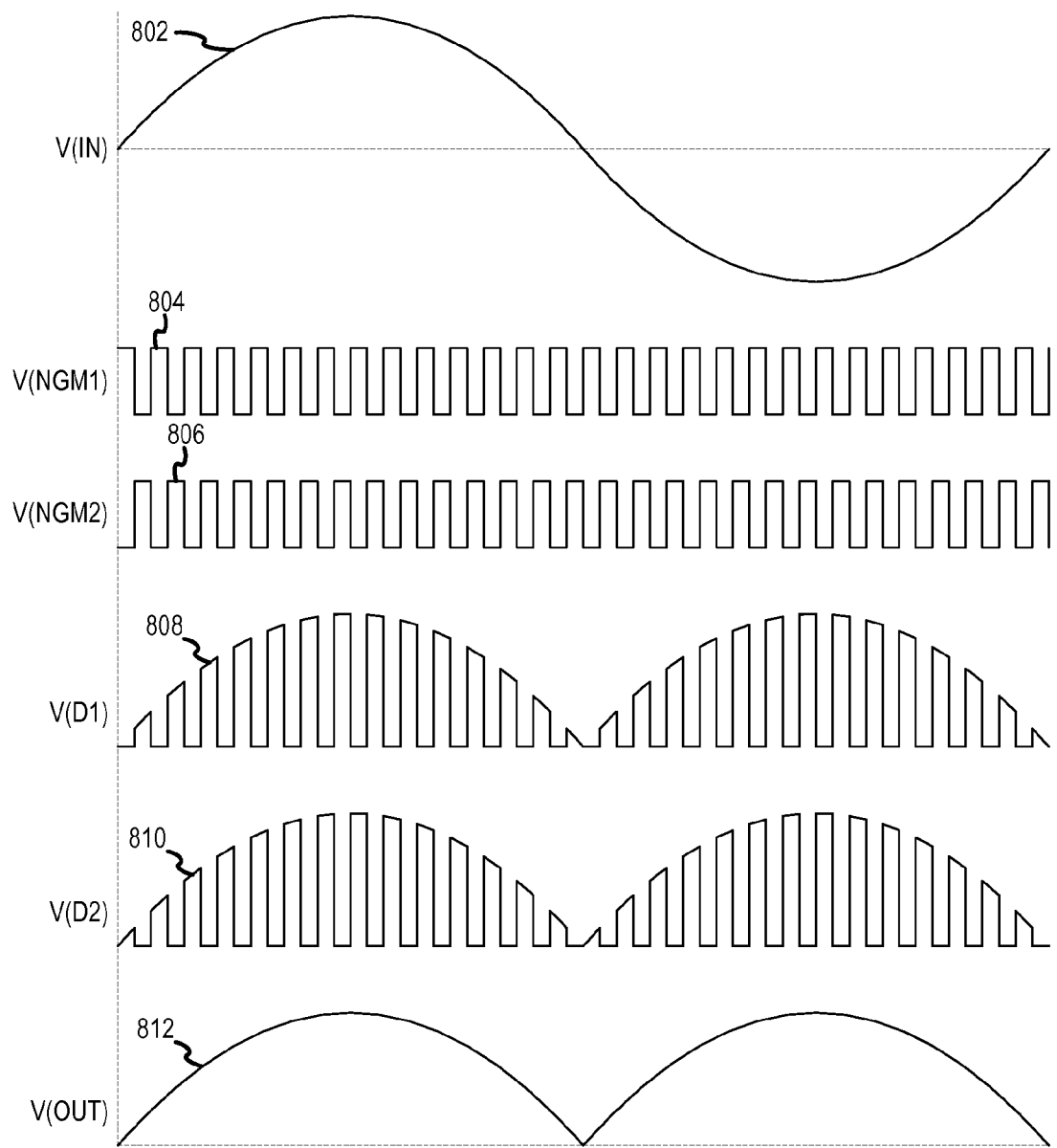
FIG. 8 illustrates operational waveforms of an auxiliary input circuit that may be employed in a dual asymmetric input power supply unit, according to various embodiments.

When auxiliary input circuit 160c is enabled to supply power from auxiliary input voltage 712, transistors 764 and 765 are driven with out-of-phase square wave signals by controller 762. FIG. 8 illustrates drive waveforms that may be used to drive transistors 764 and 765, and the resulting voltage at output 780 of auxiliary input circuit 160c when it is enabled via auxiliary control input 766. In FIG. 8, waveform 802 shows the voltage of an AC input source connected to auxiliary input 712 of auxiliary input circuit 160c. Waveforms 804 and 806 illustrate out-of-phase drive control signals for switching transistors 764 and 765, respectively. For ease of understanding, the time scale of waveforms 804 and 806 in FIG. 8 is not illustrated to scale compared to the time scale of AC input voltage waveform 802. For example, the switching frequency of transistors 764 and 765 may be 10-100 KHz range, while the line frequency of the AC input source illustrated by waveform 802 may be 50-60 Hz. In one embodiment, transistors 764 and 765 are switched at approximately 50 KHz. Additionally, while waveforms 804 and 806 illustrate only out-of-phase square wave signals, in practice, transistors 764 and 765 may be driven by non-overlapping drive waveforms, which means that for each cycle one transistor is not turned on until a short time after the other transistor has been turned off.

Waveforms 808 and 810 illustrate the voltage that would be present at the cathodes of diodes D1 (767) and D2 (768) if the cathodes were not connected together. As described above, the time scale of switching of waveforms 808 and 810 is not shown to scale as compared to the time scale of AC input waveform 802. With diodes D1 (767) and D2 (768) connected together, the resulting voltage at output 780 of auxiliary input circuit 160c is illustrated by waveform 812. In practice, waveform 812 may have a slight ripple due to switching waveforms 804 and 806. However, this ripple may be smoothed by the small (~1 uF) bypass capacitors typically present on input 118 to PFC circuit 140.

Referring back to FIG. 1, aspects of dual asymmetric input PSU 100 may be used to provide modular power systems that provide redundancy with respect to PSU's or input power sources. For example, auxiliary input circuit 160 could be in a separate enclosure that plugs into, or is connected by power cables, to a single-input PSU with an auxiliary input to the PFC.

Figure 9:
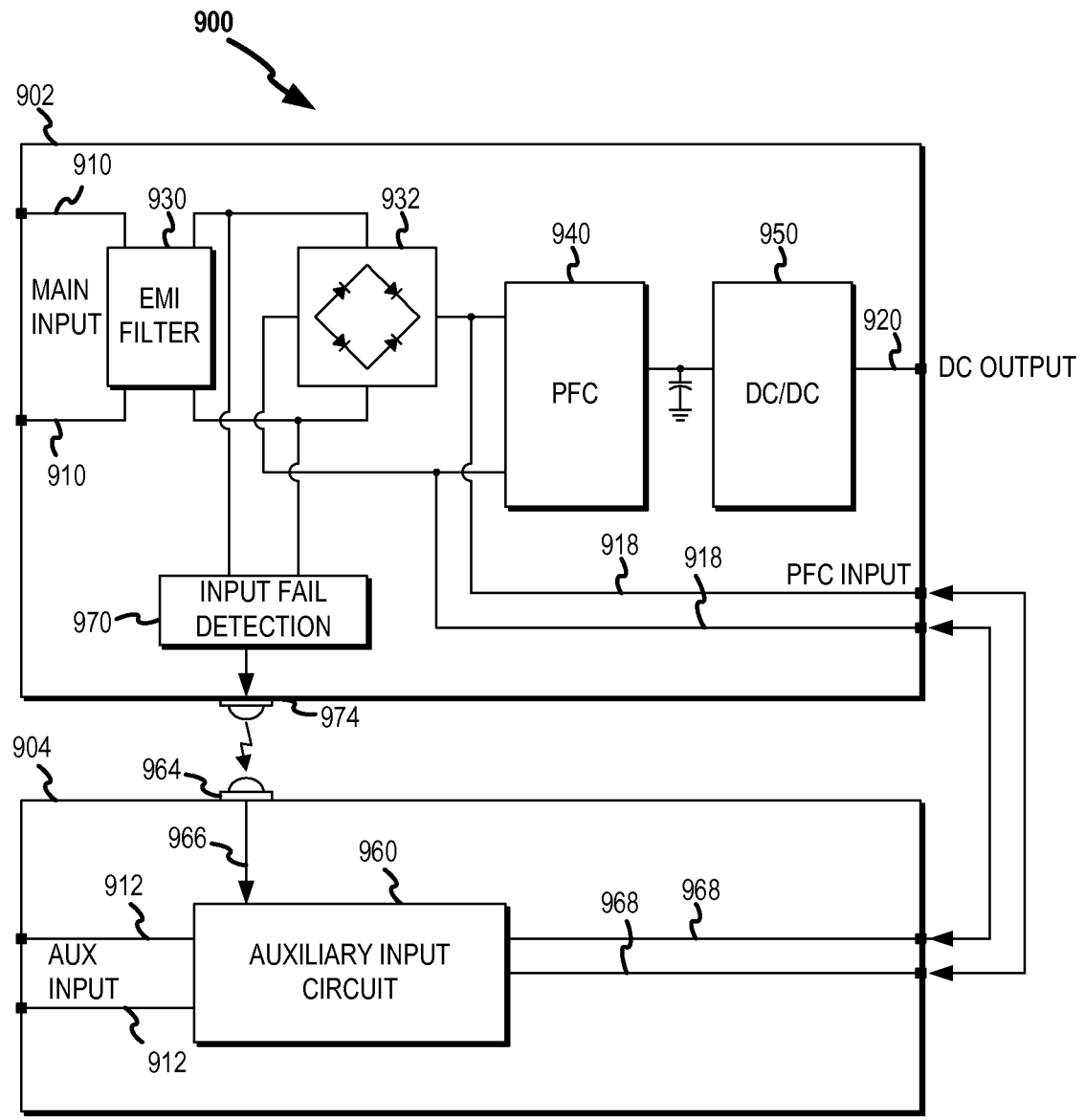
FIG. 9 illustrates a power system that employs aspects of the dual asymmetric input power supply unit architecture, according to various embodiments.

FIG. 9 illustrates power system 900 that employs aspects of the dual asymmetric PSU architecture described above. In power system 900, auxiliary input module 904 provides a redundant input power path to single-input PSU 902. Single-input PSU 902 has PFC input port 918 to allow single-input PSU 902 to accept input power from an auxiliary source. Auxiliary input module 904 includes auxiliary input circuit 960 that accepts auxiliary control input 966. Auxiliary input circuit 960 may accept an AC voltage, high-voltage DC, and/or low-voltage DC auxiliary input power source at auxiliary input 912. For example, auxiliary input circuit 960 may be one of auxiliary input circuit 160a, 160b, or 160c, as described above.

Auxiliary input module 904 adds input power source redundancy to power system 900 with lower additional cost than a redundant single-input PSU. When the power source connected to input 910 of single-input PSU 902 is present, auxiliary input circuit 960 is disabled and single-input PSU 902 provides power to DC output(s) 920 from the power source connected to input 910. If a fail condition of the input power source connected to input 910 is detected by input fail detection circuit 970, input fail detection circuit 970 indicates the failure condition to auxiliary input circuit 960 of auxiliary input module 904 through a galvanically isolated coupling. As illustrated in FIG. 9, the galvanically isolated coupling includes optical coupling emitter 974 and optical coupling receiver 964. In auxiliary input module 904, auxiliary input circuit 960 of auxiliary input module 904 receives the indicator through auxiliary control input 966 and provides power to PFC input connection 918 from auxiliary input 912 through module output 968. In embodiments, input fail detection circuit 970 may be located outside of single-input PSU 902. For example, input fail detection circuit 970 may be located in auxiliary input module 904. In this instance, the power supply connected to input 910 of single-input PSU 902 is also connected to an input of auxiliary input module 904. Alternatively, input fail detection circuit 970 may be located in third module that is separate from single-input PSU 902 and auxiliary input module 904. For example, in a power system with multiple single-input PSUs 902 and multiple auxiliary input modules 904, a single input fail detection module may monitor the primary input power source connected to the main inputs 910 of the single-input PSUs 902 and enable the auxiliary input modules 904 to provide power from one or more auxiliary power sources connected to auxiliary input 912 of auxiliary input modules 904.

Various other power system configurations may be created using the modules of power system 900. For example, more than one auxiliary input circuit 904 may have outputs 968 connected to one single-input PSU 902 to provide multiple redundancy of the input power source. In this way, multiple AC or DC auxiliary or backup power sources could be available if the primary power source connected to the main input 910 of the single-input PSU 902 fails.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs usually reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions

What is claimed is:

1. A method of enabling an auxiliary power input to a power converter, the power converter including a primary power input and a converter stage coupled to the primary power input that converts an unregulated input voltage at a power factor correction (PFC) input to a regulated output voltage at a power converter output, the method comprising:
    monitoring the primary power input;
    detecting a failure condition of the primary power input; and
    activating an auxiliary switching mode input circuit, in response to detecting the failure condition, to provide a rectified voltage at the PFC input from the auxiliary power input, the auxiliary switching mode input circuit being transformer-isolated from the PFC input.

2. The method of claim 1, wherein the detecting of the failure condition includes comparing a voltage of the primary power input with a threshold.

3. The method of claim 1, wherein the detecting of the failure condition includes detecting a voltage instability at the primary power input.

4. The method of claim 1, wherein the detecting of the failure condition includes detecting a frequency instability at the primary power input.

5. The method of claim 1, further including monitoring the auxiliary power input and determining that an auxiliary input power source is connected to the auxiliary power input before the activating of the auxiliary switching mode input circuit.

* * * * *